Patented Oct. 16, 1928.

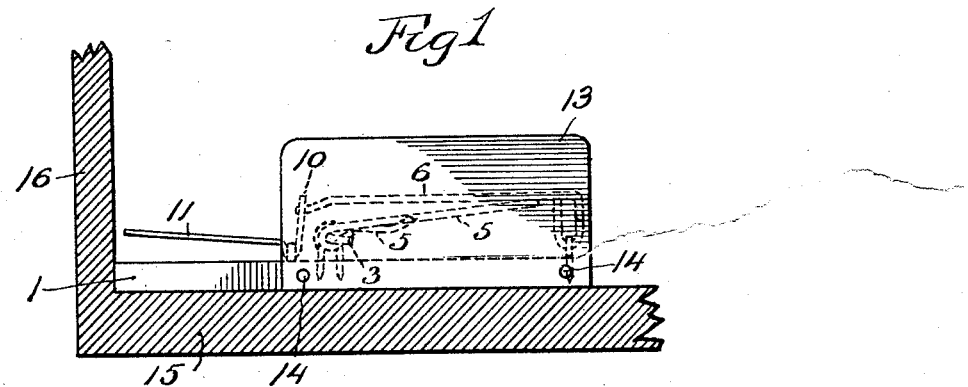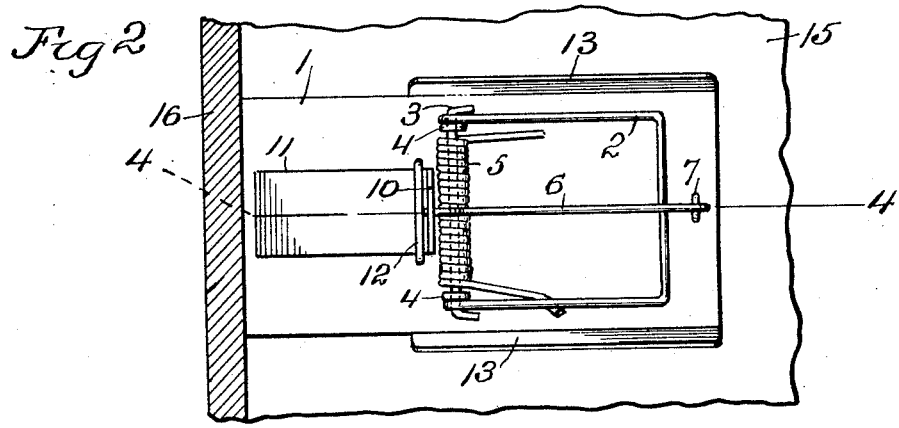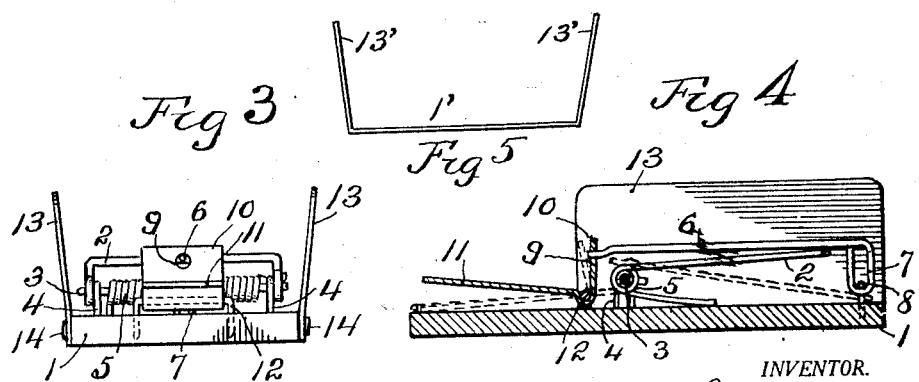

1,687,737

UNITED STATES PATENT OFFICE.

ANSEL E. RUDEEN, OF AXTEL, KANSAS.

ANIMAL TRAP.

Application filed January 12, 1927. Serial No. 160,623.

My invention relates to improvements in animal traps.

It is particularly well adapted for use in connection with mouse and rat traps.

My invention has for its basis the well known fact animals, such as mice and rats, in passing through a room usually run along the floor closely adjacent to the wall of the room.

One of the objects of my invention is to provide an animal trap of the kind described, with novel means which tends to guide an animal along a course which intersects the controlling tread member with which traps of this general character are usually provided.

A further object of my invention is to provide guide members of novel arrangement which may be attached to opposite side edges of a common mouse or rat trap for the purpose of guiding an animal along a course that will take him over the controlling tread member of the trap.

The novel features of my invention are hereinafter fully described and claimed.

In the accompanying drawing, which illustrates my invention as applied to a mouse or rat trap, Fig. 1 is a side elevation of my improved trap disposed on a floor closely adjacent to a wall, the floor and wall being shown in vertical section, the moving parts being shown in the set position.

Fig. 2 is a plan view what is shown in Fig. 1.

Fig. 3 is an end elevation of my improved trap.

Fig. 4 is a section of the same on the line 4—4 of Fig. 2.

Fig. 5 is an end elevation of a modified from of support.

Similar reference characters designate similar parts in the different views.

In the drawing my invention is shown applied to an animal trap of an ordinary type commonly used for catching rats or mice, and comprising a horizontal base, which may be a board or plate 1, supporting an animal killing means comprising a U-shaped striking jaw 2, the arms of which are pivoted on a transverse rod or wire 3, fastened to the base 1 by staples 4. A coil spring 5 encircles the rod or wire 3 between the arms 2 and has one end bearing on the base 1, the other end having a bearing on the under side of one of the arms 2, the tension of the spring being such as to cause it to swing the killing jaw 2 from the set position, shown in Figs. 1 and 2, and in solid lines in Fig. 4, to the striking position shown in dotted lines in Fig. 4.

A trigger comprising a rod or wire 6 has at one end a loop 7 through which extends a staple 8 mounted in the base 1. The free end of the trigger 6 is adapted to be inserted in a hole 9 provided in an upwardly extending portion 10 of a tread member comprising a plate having a forwardly extending portion 11, usually employed to support bait, which is not needed when the trap is provided with my improvement.

A staple 12 mounted in the base 1 extends over the tread member 11 whereby the latter is pivotally connected with the base 1.

The trap above described is one of the ordinary type. When my invention is applied to such a trap, there may be provided two guard members 13 the lower portions of which are respectively fastened to opposite longitudinal edges of the base 1, by securing devices, such as tacks 14.

The portion 11 of the tread member extends to a point near one end of the base 1, and projects beyond adjacent ends of the guard members 13, which may be metal plates, if desired, and which are spaced from said end of the base 1 a distance sufficient to permit of the passage of the animal to be caught across the tread member portion 11.

The trigger 6, tread member portion 10, spring 5, and striking jaw 2, when the latter is in the set position, are disposed between the guard members 13.

In the operation of the trap, the striking jaw 2 is moved to the set position, shown in Figs. 1, 2 and 3 and in solid lines in Fig. 4, and held in such position by the trigger 6 which is engaged with the tread member portion 10, in the well known manner of setting such traps.

The trap is then placed with the base 1 resting on the floor 15, Figs. 1 and 2, with its end which is adjacent to the tread portion 11 against a wall 16. As is well known, animals, such as rats and mice nearly always travel across a room close to one of the walls. With the trap positioned as described a clear space will be provided between the guard members 13 and the wall 16 which will be along the course traveled by the animal.

The guard members 13 will prevent the animal from passing over the trap without crossing the tread member portion 11, which is relatively wide, so that the animal will step thereon, thereby releasing the trigger and permitting the spring 5 to swing the striking jaw 2 so that the latter will strike and kill the animal or clamp it to the base where it will be held. By having the tread member disposed wholly above the base 1, but spaced from the adjacent end thereof, the trap may be readily placed on the floor with the said end of the base against the wall, without liability of the tread member striking the floor or wall, so as to accidentally set off the trap.

By having the members of the killing means, excepting the tread member, when in the set position, disposed, as shown in Fig. 4, wholly between the guard members 13 and below the upper edges thereof, there is no liability of these housed members being accidentally struck so as to prematurely set off the trap.

If desired the guard members 13 may be made integral with the base 1, as shown in Fig. 5, which may be effected by making the base and guard members from a single sheet of metal, a portion of which will be the base 1' and two lateral portions of which will be bent up and form guard members 13', thereby providing a support for the killing means, the latter being located between the guard members or side walls 13' of said support.

I have found by practical demonstration that my improved trap is very efficient when disposed adjacent to a wall, as shown, and no bait is required to be used.

I do not limit my invention to the structure shown and described, as many modifications, within the scope of the appended claim, may be made without departing from the spirit of my invention.

What I claim is:

In an animal trap, the combination with a base, animal killing means mounted thereon including a controlling tread member adapted to be moved by an animal from a set to a released position and disposed wholly above said base and spaced from but adjacent to one end of said base, of two guard members fastened respectively to opposite side edges of and extending above said base and spaced from said end of said base, said tread member extending beyond said guard members toward said end of said base, and all of said killing means, excepting said tread member, when in the set position, being disposed wholly between said guard members and below the upper edges thereof.

In testimony whereof I have signed my name to this specification.

ANSEL E. RUDEEN.